Patented Mar. 16, 1926.

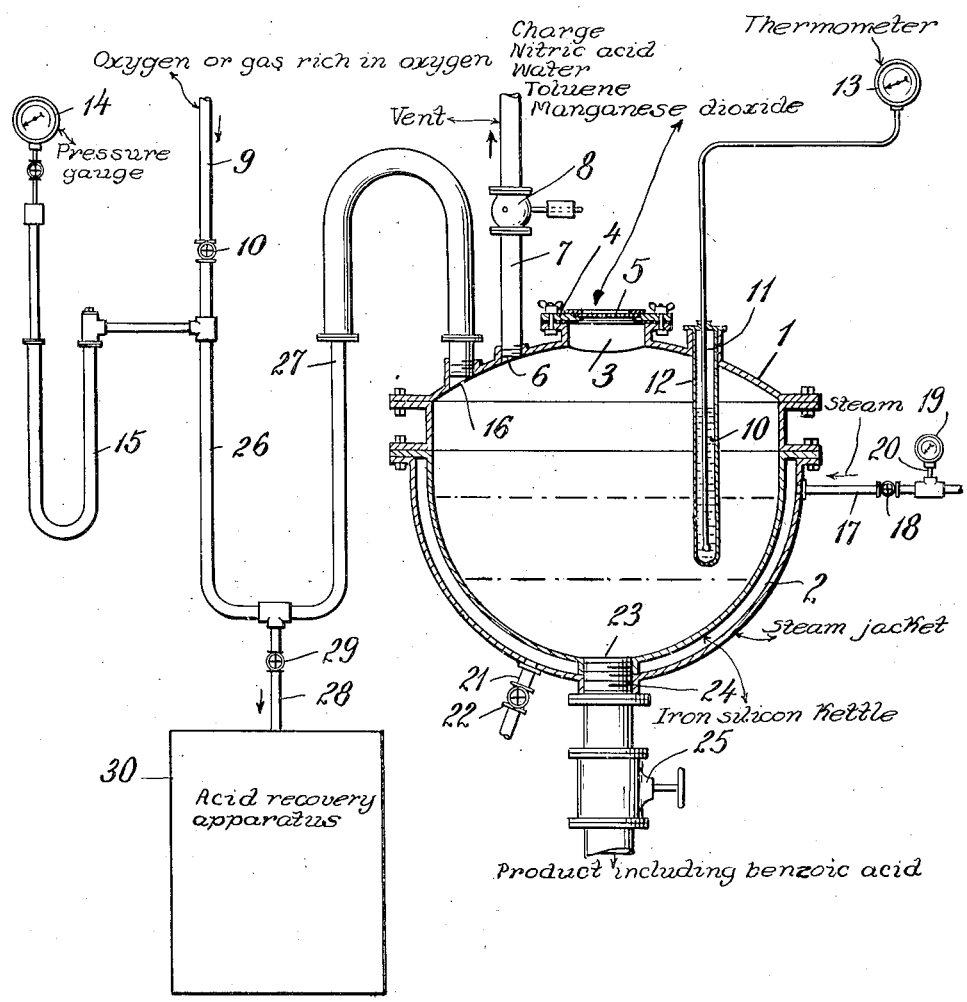

1,576,999

UNITED STATES PATENT OFFICE.

PAUL SEYDEL, OF JERSEY CITY, NEW JERSEY, ASSIGNOR, BY MESNE ASSIGNMENTS, TO SEYDEL CHEMICAL COMPANY, OF NEW YORK, N. Y., A CORPORATION OF WEST VIRGINIA.

METHOD OF OXIDIZING AROMATIC SIDE-CHAIN COMPOUNDS.

Application filed July 16, 1921. Serial No. 485,342.

*To all whom it may concern:*

Be it known that I, PAUL SEYDEL, a citizen of the United States, residing at Jersey City, in the county of Hudson, State of New Jersey, have invented certain new and useful Improvements in a Method of Oxidizing Aromatic Side-Chain Compounds; and I do hereby declare the following to be a full, clear, and exact description of the invention, such as will enable others skilled in the art to which it appertains to make and use the same.

This invention relates to the oxidation of aromatic organic compounds containing an oxidizable side-chain, and has for its object the production, in an economical and commercially feasible manner, of an aromatic acid of a high degree of purity and more particularly of benzoic acid suitable for use as a food preservative or for the production of various pharmaceutical and medicinal preparations.

Heretofore in converting aromatic side-chain compounds into their corresponding acids, methods involving the use of various oxidizing agents such as sulfuric-chromic acid mixture, permanganate, persulfate, nitric acid (in conjunction with chlorine), and manganese dioxide (with sulfuric acid) have commonly been employed. Of these methods the three first mentioned involve the use of expensive chemicals which can not be readily or economically recovered and they are, therefore, entirely unsuited for the economical production of an aromatic acid on a commercial scale.

The two remaining methods, while not open to this particular objection as to cost of reagents, each possesses, nevertheless, certain other disadvantages which render its use inconvenient and expensive, especially where purity of product is an important requirement, as in the present case. Thus the manganese dioxide-sulfuric acid process, when applied to the production of benzoic acid from toluene, yields a crude product containing tarry impurities which are exceedingly difficult to remove from the aromatic acid and for this reason the cost of production of a highly purified product is excessively high. The formation of tarry products is due to the difficulty of controlling the oxidation so as to prevent the oxidation from proceeding too far, resulting in the formation of oxidation products other than the aromatic acid. Even the formation of a considerable amount of carbon dioxide is not readily avoided when this method is employed.

On the other hand, while it is true that the course of the oxidation can be better regulated and controlled by means of the chlorine-nitric acid method of oxidation so that the production of tarry impurities and other oxidation by-products is largely avoided, yet this method involves another difficulty which renders its use altogether objectionable for the production of benzoic acid of a high degree of purity. This difficulty arises from the fact that certain chlorine substitution products in which the chlorine is in the benzene nucleus are formed during the course of the reaction and these are exceedingly difficult to remove from the benzoic acid. These chlorine substitution products are particularly objectionable as impurities in the benzoic acid where the product is to be used as a preservative or for certain pharmaceutical purposes, and in these instances, even the slightest traces of these chlorinated impurities must be altogether avoided.

The process of the present invention avoids all the foregoing difficulties and in addition may be carried out in a highly economical manner and practically without loss of any of the raw material. Furthermore the oxidation by means of this process can be carried out in an especially short period of time thereby economizing in labor and equipment and resulting in an unusually low cost of production in comparison with any of the older methods.

The method of the present invention depends upon the direct oxidation of the aromatic side-chain compound by means of nitric acid under specially controlled conditions, particularly with respect to the pressure under which the oxidation is carried out. Another important feature of the present invention is the use of an accelerator or catalyst in connection with the nitric acid. Other novel features of the process lie in the inter-relation or inter-action of the nitric acid and the auxiliary oxidizing agent or catalyst and also in the proper regulation and mutual adjustment of the temperature and pressure, under which conditions the active oxidation of the aromatic compound takes place. Still another feature of the invention is the regulation and control of the concentration of the gaseous oxides of nitrogen in or above the reaction mixture during the course of the oxidation.

This regulation and control of the concentration of the gaseous oxides of nitrogen is brought about in part by introducing at intervals into the reaction chamber the proper amount of concentrated gaseous oxygen and also by the removal from the reaction chamber at certain intervals of the spent or exhausted oxides of nitrogen (mainly lower oxides) formed during the reaction. By these means the speed and course of the oxidation can be controlled and regulated in such manner that practically the whole of the aromatic side-chain compound is converted into useful products, principally the aromatic acid, and at the same time the complete oxidation can be carried out in a remarkably short period of time and substantially without loss of nitric acid or aromatic compound.

One of the most remarkable features of the new process is the effect of the above mentioned control of the concentration of the oxides of nitrogen and of the pressure upon the speed of the reaction. This is strikingly illustrated by the fact that at a given temperature the reaction may be completed in a shorter time by employing these means than is required for completing the reaction at even an appreciably higher temperature when the above mentioned regulation of pressure and concentration of gas is not employed. This is in addition to a greatly increased yield.

The process of the present invention may be carried out in various types of apparatus, but I have found the new apparatus described in the following paragraphs to be especially well adapted for carrying out my new process. The various novel features of both the process and the apparatus and the advantages gained thereby will appear more clearly from the following detailed description of the apparatus and the manner of using the same for carrying out my new improved process.

The apparatus in its preferred form is made of a corrosion-resisting metal, preferably an iron-silicon alloy containing a high percentage of silicon, such as the alloy known as "duriron" or "tantiron" and comprises a 500 gallon kettle, 1, provided with a steam jacket, 2, for heating the same, and provided also with an opening 3 in the top for introducing the charge into the kettle. The cover 4 is provided with clamps and a gasket by means of which the opening 3 may be tightly closed so as to prevent the escape of the gasese under pressure within the kettle. The cover 4 is further provided with a window 5 for viewing the changes in the appearance of the materials which take place during the progress of the reaction. The kettle is provided further at the upper part thereof with an opening 6 leading into the exit pipe 7 and the pressure safety valve 8 by means of which a portion of the gaseous mixture is allowed to escape from the kettle to reduce the pressure therein. The pipes 28 and valve 29 are connected with a suitable acid-recovery equipment 30 illustrated diagrammatically, such as an acid tower or a series of Woulfe bottle of the type and arrangement commonly used for concentrating or recovery of nitric acid. An inlet tube 9 and valve 10 connecting with the tubes 26 and 27 serve as a means for introducing compressed oxygen or other gas rich in oxygen under pressure into the reaction mixture in the kettle at certain stages of the reaction. The thermo-couple or resistance element 11 extends into and is surrounded by the thermometer well 12 fitted into the top of the kettle and is connected with the recording element 13, which records the approximate temperature of the mixture throughout the course of the reaction. A recording pressure-gauge 14 is connected through the U tube 15, containing oil and the tubes 26 and 27 to the upper portion of the kettle through the opening 16. The steam jacket is connected through the inlet tube 17 and the valve 18 with a steam boiler or other source of steam. The pressure-gauge 19 is connected through the tube 20 to the steam jacket. The steam jacket is further provided with an outlet tube 21 and valve 22. The kettle is further provided at the bottom with a wide opening 23 leading into the short wide pipe 24 which extends through the outer wall of the steam jacket and is provided with a valve 25.

In carying out a typical example or embodiment of the process of my invention, the kettle is charged through the opening 3 with 850 pounds of 67 per cent nitric acid, 800 pounds of water, 500 pounds of toluene and 5 pounds of manganese dioxide. The concentration of the nitric acid in this typical charge is 35 per cent. The total weight of 100 per cent $HNO_3$ is 570 pounds and the charge contains one pound of toluene to each $1\frac{1}{10}$ pounds of 100 per cent nitric acid. After the charge has been introduced into the kettle, the cover 4 is clamped in place and the temperature is brought by means of the steam in the steam-jacket gradually to 80° to 90° C., at which time the pressure in the kettle will usually be about 35 to 40 pounds per square inch. The period of this gradual rise of temperature is about two hours. After the temperature and pressure have reached the last mentioned values, they are maintained at about this range of magnitude for a period of from about six to seven hours during which period oxygen is occasionally introduced under pressure through the inlet pipe 9 which is connected through the valve 10 with an oxygen tank, not shown in the drawing, containing oxygen under high pressure. At the end of this period or more frequently during the course of the reaction the kettle is vented of the spent gases which have accumulated therein so as to maintain the concentration of the active or oxidizing oxides of nitrogen at a more or less constant concentration and also to lower the pressure. This is accomplished by opening the release valve 29 which connects the exit pipe 28 with the recovery apparatus, 30, illustrated diagrammatically in the drawing, for recovering spent oxides of nitrogen, toluol-vapor, etc. This release of spent gases and subsequent introduction of oxygen under pressure is preferably repeated three or four times during the 24 hours required for completion of the operation, the pressure being eventually raised to about 75 pounds and the temperature to about the boiling point of toluene or about 110° C.

At the end of 24 hours the reaction is completed and the reaction mass contains an amount of benzoic acid corresponding to a yield of from 70 to 80 per cent of the theoretical. This reaction mass, when hot, is in a liquid state. It may be poured or dumped into a tank suitable for this purpose. On cooling the mass will form a solid cake. This cake is freed from the spent nitric acid and is purified by first neutralizing the crude benzoic acid with caustic soda or soda ash, precipitating benzoic acid from this salt with a strong mineral acid, washed, using preferably a continuous acid proof filter, such as a filter of the type known as the "Oliver filter". The filter cake of benzoic acid is centrifuged in order to eliminate the greater portion of the moisture and is then dried and finally sublimed to obtain the pure finished product.

It will be understood that the foregoing example of the process of my invention is given by way of illustration and I do not restrict my invention to the details described therein, but I may vary the conditions and the procedure without departing from my invention in accordance with the description of the main features of my invention given above.

Thus, I may vary the quantity and the strength of the nitric acid used per pound of toluene and I may also vary the quantity of manganese dioxide or I may use other nitric oxide catalysts, such as vanadium oxide and the like. Also I may vary the pressure between 35 pounds per square inch and 80 pounds per square inch or higher and I may also begin the reaction with less water than that specified and employ such an amount of nitric acid as will give the required strength (approximately 30 to 40 per cent) and as the oxidation proceeds and the strength of the acid weakens, I may add a fresh quantity of strong nitric acid from time to time during the course of the reaction, thereby maintaining approximately the same strength of nitric acid during the entire period of oxidation.

Also instead of carrying on the operation continuously, say for 24 hours, the operation may be interrupted, in order to make either two periods or "shifts" of 12 hours or three periods of 8 hours or several periods of still shorter duration, thus facilitating the addition of fresh materials at the close of these different operating periods, when the apparatus and reaction mixture have cooled somewhat. In this manner the concentration of the nitric acid and the relative proportion of manganese dioxide, the relative proportion of water and of toluene can be held at approximately constant values and the reaction controlled to better advantage by any or all of these means.

The object of introducing oxygen under pressure into the apparatus is to oxidize the lower and inactive oxides of nitrogen into the higher and active oxides of nitrogen and in this manner to aid in maintaining the concentration of the active oxides of nitrogen at a more nearly constant and favorable value, the venting of the spent oxides of nitrogen and other inactive gases contributing also to this same end.

The manganese dioxide, which is added at intervals in small portions so as to have at the end of the experiment about 10 pounds to each 500 pounds of toluene, hastens the oxidation, I believe, by its catalytic action on the nitric acid or probably by reaction with the latter to form an intermediate product which is later decomposed by reaction with the toluene.

After the completion of the operation, whatever slight amount of benzoic acid which is not dissolved in the hot weak nitric acid is contained in the oily layer composed of the unreacted toluene and some oily by-products of the reaction, mostly various nitro-toluenes, condensation products, ketones, etc., but no considerable amount of benzaldehyde. After cooling the reaction product and separating the crude benzoic acid, the unreacted toluene and nitric acid are utilized for making up the next charge for the reaction kettle. Also the nitric acid and toluene recovered from the vented gases by means of the recovery apparatus are utilized in the same manner.

The proportion of nitro products formed and separated with the crude benzoic acid is usually about 5 to 10 per cent. However, these nitro products are valuable and can be recovered. This is done by exercising special care in subliming the benzoic acid so as not to exceed a certain temperature, which leaves behind the nitro-benzoic acid which may be separated through fractional crystallization of their salts or by any other convenient method. The amount of nitro-products formed vary according to the strength of the nitric acid used, being greater if the strength of the nitric acid is increased. Thus, it will be seen that from 90 to 95 per cent or more of the toluene is converted entirely into valuable and marketable commercial products, benzoic acid constituting from 70 to 80 per cent of the yield and the nitro-benzoic acid and the few other by-products constituting the remainder.

In purifying the crude benzoic acid the latter is treated with an alkali, preferably sodium, although calcium and other metallic oxides or carbonates will serve. It is best treated either with caustic soda or sodium carbonate, which brings it into solution and makes easy the separation in conical tanks (or other tanks designed to separate two layers of liquids) from the oily substance, mainly toluol, nitro toluol, etc. This solution, when evaporated, will give a technical sodium benzoate. In order to obtain a C. P. product, it is advisable to precipitate the acid from its salt solution; thoroughly wash it in centrifugal machines or suction filters, provided with washing devices, dry the cakes obtained and either crystallize the acid from hot water, or preferably sublime it at a temperature sufficiently low to prevent carrying over the nitro acids present.

The oxidation of the nitro-toluenes into their corresponding nitro-benzoic acids proceeds in very much the same manner as the oxidation of the toluene itself; the action being more active and indeed under some circumstances being even violent, I take good care to closely observe temperatures, pressures and the relativity of the gaseous and liquid oxidizers to the amount of nitro-toluenes present.

I claim:

1. The method of oxidizing an aromatic side-chain compound which comprises subjecting it to the action of nitric acid under a pressure of from about 40 to 80 pounds per square inch, substantially as described.

2. The method of oxidizing an aromatic side-chain compound which comprises subjecting it to the action of nitric acid of a concentration of about thirty to forty per cent under a pressure or from about 40 to 80 pounds per square inch, substantially as described.

3. The method of oxidizing an aromatic sdie-chain compound which comprises subjecting it to the action of nitric acid under pressure and maintaining the concentration of the nitric acid at a relatively constant concentration throughout the main part of the oxidation process, substantially as described.

4. In the method of claim 2, maintaining the concentration of the nitric acid at a relatively constant concentration throughout the main part of the oxidation process and under a pressure of from about 40 to 80 pounds per square inch, substantially as described.

5. The method of oxidizing toluene to benzoic acid which comprises subjecting the toluene to the action of nitric acid of about thirty to forty per cent concentration at a temperature of from about 70° centigrade to 110° centigrade and under a pressure of from about 40 to 80 pounds per square inch, substantially as described.

6. The method of oxidizing an aromatic side-chain compound which comprises subjecting it to the action of nitric acid under pressure in the presence of a catalyst containing loosely combined oxygen, substantially as described.

7. The method of oxidizing an aromatic side-chain compound which comprises subjecting it to the action of nitric acid under a pressure of from about 40 to 80 pounds per square inch, in the presence of a catalyst containing loosely combined oxygen, substantially as described.

8. The method of oxidizing an aromatic side-chain compound which comprises subjecting it to the action of nitric acid of a concentration of about forty per cent under pressure in the presence of a metallic oxide catalyst, substantially as described.

9. In the method of oxidizing an aromatic side-chain compound which comprises subjecting it to the action of nitric acid of a concentration of about forty per cent under pressure maintaining the concentration of the nitric acid at a relatively constant concentration throughout the main part of the oxidation process in the presence of a catalyst containing loosely combined oxygen, substantially as described.

10. The method of oxidizing toluene to benzoic acid which comprises subjecting the toluene to the action of nitric acid under pressure and at a temperature of from about 70° centigrade to 110° centigrade in the presence of a catalyst containing loosely combined oxygen, substantially as described.

11. The method of oxidizing toluene to benzoic acid which comprises subjecting the toluene to the action of nitric acid of about forty per cent concentration and at a temperature of from about 70° centigrade to 110° centigrade under pressure in the presence of a catalyst containing loosely combined oxygen, substantially as described.

12. The method of oxidizing toluene to benzoic acid which comprises subjecting the toluene to the action of nitric acid of about forty per cent concentration and at a temperature of from about 70° centigrade to 110° centigrade under a pressure of from about 40 to 80 pounds per square inch in the presence of a catalyst containing oxygen, substantially as described.

13. The method of oxidizing an aromatic side-chain compound which comprises subjecting it to the action of nitric acid under pressure in the presence of an oxide of manganese, substantially as described.

14. The method of oxidizing an aromatic side-chain compound which comprises subjecting it to the action of nitric acid under a pressure of from about 40 to 80 pounds per square inch in the presence of an oxide of manganese, substantially as described.

15. The method of oxidizing an aromatic side-chain compound which comprises subjecting it to the action of nitric acid of a concentration of about forty per cent under pressure in the presence of an oxide of manganese, substantially as described.

16. The method of oxidizing toluene to benzoic acid which comprises subjecting the toluene to the action of nitric acid of a concentration of about forty per cent under a pressure of from 40 to 80 pounds per square inch in the presence of an oxide of manganese, substantially as described.

17. In the method of oxidizing toluene to benzoic acid which comprises subjecting the toluene to the action of nitric acid of a concentration of about forty per cent, maintaining the concentration of the nitric acid at a relatively constant concentration throughout the main part of the oxidation process in the presence of an oxide of manganese, substantially as described.

18. In the method of oxidizing toluene to benzoic acid which comprises subjecting the toluene to the action of nitric acid of a concentration of about forty per cent, maintaining the concentration of the nitric acid at a relatively constant concentration throughout the main part of the oxidation process and under a pressure of from about 40 to 80 pounds per square inch in the presence of an oxide of manganese, substantially as described.

19. The method of oxidizing toluene to benzoic acid which comprises subjecting the toluene to the action of nitric acid under pressure at a temperature of from about 70° centigrade to 110° centigrade in the presence of an oxide of manganese, substantially as described.

20. The method of oxidizing toluene to benzoic acid which comprises subjecting the toluene to the action of nitric acid of about forty per cent concentration and at a temperature of from about 70° centigrade to 110° centigrade under pressure in the presence of an oxide of manganese, substantially as described.

21. The method of oxidizing toluene to benzoic acid which comprises subjecting the toluene to the action of nitric acid of about forty per cent concentration and at a temperature of from about 70° centigrade to 110° centigrade under a pressure of from about 40 to 80 pounds per square inch in the presence of an oxide of manganese, substantially as described.

22. The method of oxidizing an aromatic side-chain compound which comprises subjecting it to the action of nitric acid under pressure, carrying out the oxidation in an atmosphere containing oxidizing oxides of nitrogen, maintaining the concentration of the oxidizing gaseous oxides of nitrogen at a relatively constant value by introducing substantially pure oxygen under pressure into said atmosphere and removing non-oxidizing gases from said atmosphere, substantially as described.

23. In the method of claim 6, maintaining the ratio of the weights of nitric acid to catalyst at a relatively constant value, substantially as described.

24. The method of oxidizing an aromatic side-chain compound which comprises subjecting it to the action of nitric acid under a pressure of from about 40 to 80 pounds per square inch in the presence of an oxidation catalyst, substantially as described.

25. The method of oxidizing an aromatic side-chain compound which comprises subjecting it to the action of nitric acid of about thirty to forty per cent concentration under a pressure of from about 40 to 80 pounds per square inch in the presence of an oxidation catalyst, substantially as described.

26. The method of oxidizing toluene to benzoic acid which comprises subjecting the toluene to the action of nitric acid under a pressure of from about 40 to 80 pounds per square inch and at a temperature of from about 70° centigrade to 110° centigrade in the presence of an oxidation catalyst, substantially as described.

27. The method of oxidizing toluene to benzoic acid which comprises subjecting the toluene to the action of nitric acid of about thirty to forty per cent concentration and at a temperature of from about 70° centigrade to 110° centigrade under a pressure of from about 40 to 80 pounds per square inch in the presence of an oxidation catalyst, substantially as described.

In testimony whereof I affix my signature.

PAUL SEYDEL.